Patented Mar. 17, 1942

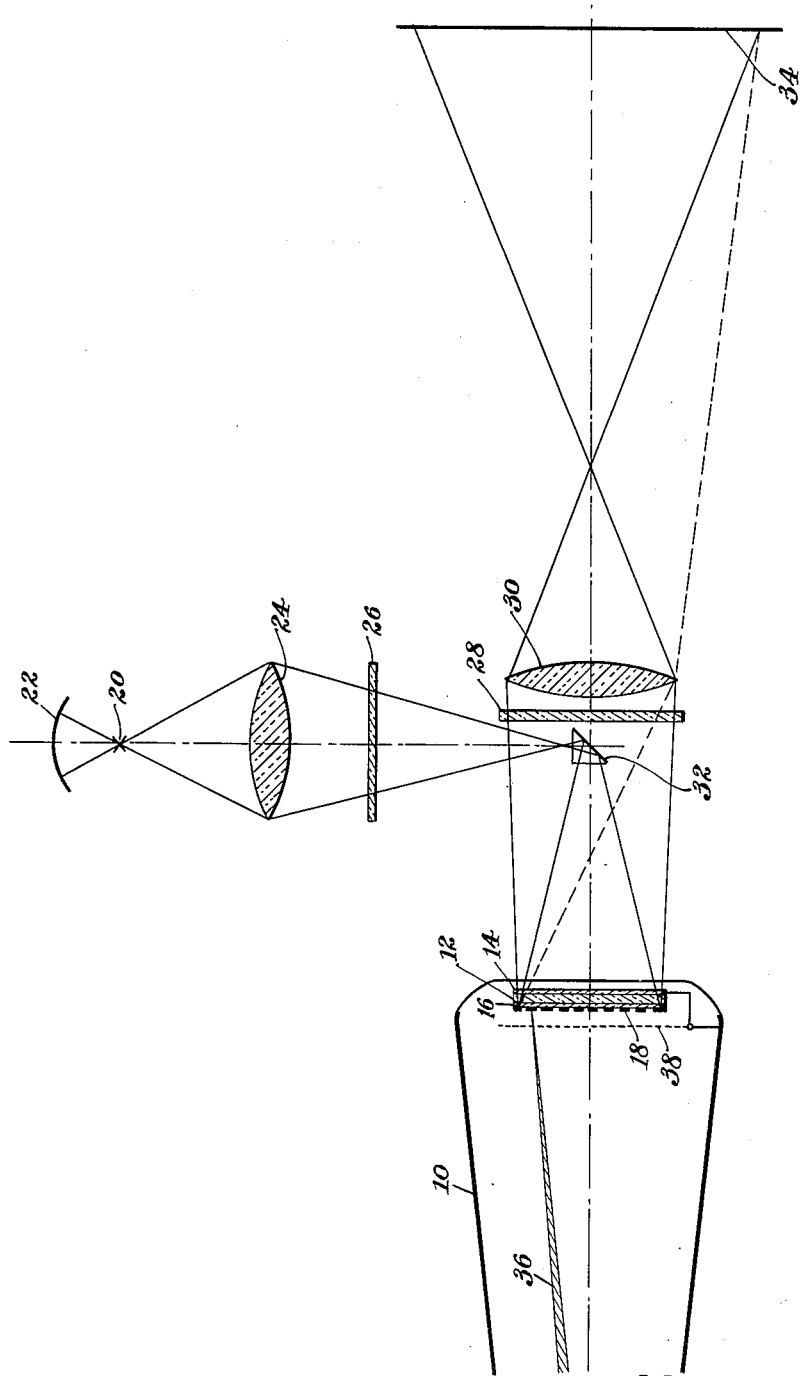

2,276,360

UNITED STATES PATENT OFFICE 2,276,360

TELEVISION PROJECTION TUBE

Manfred von Ardenne, Berlin, Germany

Application November 29, 1939, Serial No. 306,611
In Germany November 21, 1938

2 Claims. (Cl. 178—7.5)

This invention relates to an improvement in television receiving tubes of the cathode ray type wherein a projected image may be produced. Examples of such tubes are shown and described in my patent applications Serial #292,-017 filed August 16, 1939, Serial #307,573, filed Dec. 5, 1939, and Serial #306,610, filed Nov. 29, 1939. In all of the arrangements shown and described in these applications, however, the electron responsive electrode or crystal screen is not positioned normal to the scanning beam of electrons but is inclined with respect to the axis of the electron gun structure. This angle of inclination naturally causes trapezoidal distortions and for the elimination or compensation of such distortion special correction means or deflection systems must be provided. The embodiment comprising a sloped screen, which is chosen only for imperative physical reasons, involves the further disadvantage that the light-optical projector system may not or cannot be placed at any desired proximity to the crystal screen. These difficulties have been obviated by the present invention. In fact, the electro-optical system is here located on one side and the light-optical system upon the opposite side. Both the major axis of the electro-optical system as well as the major axis of the light-optical system coincide and are at right angles to the plane of the relay or crystal screen.

The invention may best be understood by referring to the drawing, wherein the single figure represents the preferred form of the invention.

Referring now to the drawing, the crystal plate 12 (for instance, zinc blende of suitable axis orientation), upon its face turned towards the light-optical system, bears a transparent, conducting layer 14, say, a coat of zinc oxide. This layer is connected with the main or second anode of the cathode ray gun structure (not shown) which is contained in the tube 10. Upon the opposite face of the crystal screen or plate is placed an auxiliary layer which is also transparent and possesses high insulation power, the said auxiliary layer 16 possessing a certain secondary electron emission characteristic, and is so applied or cemented that optical contact with the screen is insured. The thickness of the said auxiliary layer 16 should be made small in contrast to the thickness of the crystal screen 12. This auxiliary layer 16 carries light-reflecting metal particles 18 which are insulated from one another, the particles being of a size and arrangement similar to the alkali metal particles of the "iconoscope." In order that the reflection may be as directional as possible the manufacturing process should be so that the metallic particles 18 will be perfectly flat upon the surface of the auxiliary layer 16. It is only when this condition is fulfilled that the insulating interspaces between the particles are not unnecessarily large, in order that a high percentage of the light issuing from the projector lamp 20, focused by the condensing lens 24, polarized by polarizing filter 26 and deflected by a 90-degree prism 32, will reach the projection screen 34 by way of the second crossed polarizing filter 28 and the projection optical means 30. For instance, the metallization (metallic deposit) could be produced by a coat or film of aluminum deposited upon the auxiliary layer 16 in vacuum vaporization, insulating interstices being subsequently produced by the aid of a stylus or other tool to remove the metal layer as done in the case of ruled screens or rasters.

In front of the layer consisting of metal particles 18 is provided again a screen grate or network 38 of the kind described in the above referred to patent application Serial #292,017, with a view to removing streaks or shadows. By the aid of one or of several cathode ray beams 36, the insulated metal particles 18 are charged by the use of methods as disclosed in patent application Serial #292,017, supra, in accordance with the received image signals and then discharged periodically. The electrical field which arises as a result of the storing potential between the metallic raster elements 18 and layer 14 causes the crystal plate or screen 12 to modulate the light which is permitted to reach the projection screen 34.

As disclosed in the above mentioned patent application Serial #306,610, the light-reflective layer 18 preferably consists of particles of metals or substances possessing a certain secondary electron emission characteristic, that is, the secondary emissivity characteristic of the material is to be so that unity ratio is obtained in the presence of a cathode ray accelerating potential roughly of the value of the storing potential required for maximum brightness or brilliance.

According to a further object of the present invention the auxiliary layer 16, the surface of which will also of necessity be struck by electrons in the insulating interstices of the layer 18, is to have the same secondary emissivity curve. In fact, it is only where this condition is fulfilled that charging phenomena of the auxiliary layer 16 which is liable to result in a marked flattening of the secondary-emission characteristic will be avoided.

The making of a storing-type tube as shown in the figure becomes somewhat more complicated in technical respect because of the necessity of providing layer 16. Indeed, the situation would be improved if from the outset an insulating and at the same time light-reflecting layer of low secondary emissivity were made available. Light reflection without metallic layers is available in the phenomenon of total reflection. Layer 16 shown in the figure may be omitted provided that the optical or light beam path is so modified that total reflection occurs at the boundary layer, crystal and auxiliary layer or auxiliary layer and vacuum. In this case care must be taken so that between the base face of a large prism and the outer face of the crystal plate 12, optical contact is insured, and, moreover, that the difficulties arising as a result of the slope of the crystal screen plane with respect to the major axis of the optical system are compensated by suitable compensation means of an optical nature.

The large rectangular prism and the inclined position of the relay or crystal screen with respect to the optical axes of the projection system together with all the difficulties entailed thereby are avoidable if upon the auxiliary layer 16, that is, the outer face thereof, is impressed with a fine prismatic raster. This raster may be similar to a lenticular film, and need only extend in longitudinal direction, and it may be applied upon the auxiliary layer 16 in plastic state by outside lamination. For reasons of the decrease of the electro-optically active field intensity, the base of the raster prisms should be smaller than the diameter of a picture unit or element. Inversely, the prisms should not be made too small lest undue depolarization of the light be caused together with greater difficulties of manufacture. Total reflection from the outer face of the auxiliary layer 16 will then take place in a way similar to the so-called "cat-eyes," and the efficiency will be extremely high.

In this arrangement all of the merits and advantages inhering in the figure will be retained; but such disadvantages as inhere in a layer comprising metallic particles (loss of light by cover interstices, difficulties in insulation, etc.) will be avoided, while difficulties in the design of the light-optical projection system will not be encountered.

I claim:

1. A television receiving device comprising a cathode ray tube, a target area in said tube, a gun structure in said tube adapted to produce a focused beam of electrons, said target area comprising a translucent conducting support plate, a crystal layer of predetermined uniform thickness positioned upon said support base, said crystal layer having a variable plane of polarization as determined by the electrostatic charge potential produced thereon, a layer of transparent insulating material positioned on said crystal layer, and a multiplicity of metallic light reflecting elements positioned on the surface of the ratio of the secondary electrons produced by both the insulating layer and the metallic elements being substantially identical and greater than unity as compared with the impinging beam electrons so that when the insulating layer and the metallic elements are scanned by a modulated beam a positive charge image is produced on said crystal layer in uniform proportion to the beam modulations, said target area being so positioned that the beam of electrons is directed substantially normally against the side bearing the metallic elements and said elements being adapted to receive and reflect polarized light directed substantially normally against the other side of the target area, and means including a polarizing screen adapted for focusing the light reflected from the metallic elements upon an image screen whereby an optical image may be produced on the image screen in accordance with the charge image on the crystal layer and the resulting rotation of the plane of polarization of the crystal layer.

2. A television receiving device comprising a cathode ray tube, a target area positioned in said tube area, said target area comprising a transparent conducting support plate, a layer of crystalline substance positioned on said support plate, said crystalline substance having a variable plane of polarization as determined by the electrostatic charge potential impressed thereon, a film of transparent insulating material positioned on said crystalline substance, and a multiplicity of minute metallic particles positioned on said film, means in said tube adapted for producing a beam of electrons for scanning the side of the target area upon which the metallic particles are positioned, the ratio of the secondary electrons produced by both the insulating film and the metallic elements being substantially identical and greater than unity as compared with the impinging beam electrons so that when the insulating film and the metallic elements are scanned by a modulated beam a positive charge image is produced on said crystal layer in uniform proportion to the beam modulations, means adapted to direct polarized light substantially normally against the other side of the target area, so that the light transmitted by the crystalline substance will be reflected by the metallic particles, and a polarization screen and lens system adapted for focusing the light reflected from the metallic particles upon an image screen, whereby an optical image may be produced on said image screen in accordance with the light transmitting characteristics and the rotation of the plane of polarization of the crystalline substance as determined by modulations of the cathode ray beam and the resulting charge image.

MANFRED von ARDENNE.